United States Patent
Sanders et al.

(10) Patent No.: US 8,000,675 B2
(45) Date of Patent: Aug. 16, 2011

(54) LOW COST METHOD FOR RECEIVING BROADCAST CHANNELS WITH A CELLULAR TERMINAL

(75) Inventors: Stuart B. Sanders, Cary, NC (US); Allen M. East, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1212 days.

(21) Appl. No.: 10/848,329

(22) Filed: May 18, 2004

(65) Prior Publication Data
US 2005/0233765 A1  Oct. 20, 2005

Related U.S. Application Data

(60) Provisional application No. 60/563,074, filed on Apr. 16, 2004.

(51) Int. Cl.
*H04B 1/26* (2006.01)
(52) U.S. Cl. .............. 455/313; 455/323; 455/552.1
(58) Field of Classification Search ........ 455/132–140, 455/141, 142, 188.1, 552.1–553.1, 313–334, 455/3.02, 186.1
See application file for complete search history.

(56) References Cited

U.S. PATENT DOCUMENTS

| 5,280,636 | A | 1/1994 | Kelley et al. | |
|---|---|---|---|---|
| 5,890,071 | A | 3/1999 | Shimanuki | |
| 6,215,988 | B1 * | 4/2001 | Matero | 455/188.1 |
| 6,522,895 | B1 * | 2/2003 | Montalvo | 455/553.1 |
| 6,532,370 | B1 * | 3/2003 | Underbrink et al. | 455/552.1 |
| 6,556,630 | B1 * | 4/2003 | Brinsfield et al. | 375/335 |
| 6,678,512 | B1 * | 1/2004 | Kaminski et al. | 455/323 |
| 6,686,880 | B1 * | 2/2004 | Marko et al. | 455/11.1 |
| 6,853,310 | B2 * | 2/2005 | Brinsfield | 340/870.41 |
| 6,892,076 | B2 * | 5/2005 | Maalismaa et al. | 455/552.1 |
| 6,952,595 | B2 * | 10/2005 | Ikedo et al. | 455/553.1 |
| 7,058,066 | B1 * | 6/2006 | Garakani et al. | 370/401 |
| 7,103,374 | B2 * | 9/2006 | Yla-Jaaski et al. | 455/502 |
| 7,103,375 | B2 * | 9/2006 | Garmonov et al. | 455/506 |

(Continued)

FOREIGN PATENT DOCUMENTS

DE  199 19 362  11/2000

(Continued)

OTHER PUBLICATIONS

PCT International Search Report mailed Jan. 31, 2005, PCT Application No. PCT/US2004/034912 filed Oct. 21, 2004.

(Continued)

*Primary Examiner* — Lana Le
(74) *Attorney, Agent, or Firm* — Coats & Bennett, P.L.L.C.

(57) ABSTRACT

A wireless communication terminal includes a broadcast signal frequency converter that is communicatively coupled to the terminal's communication signal receiver and is configured to use its communication receiver to process received broadcast signals. In an exemplary embodiment, the converter includes a frequency shifting circuit, e.g., a block frequency converter, that shifts broadcast signal bands into communication signal bands, such that received broadcast signals are shifted into a frequency range compatible with the communication receiver's signal path. Moreover, the significant digital domain signal processing capability of the communication receiver can be used to receive broadcast television and/or radio signals, provide signal enhancements, and extract other types of information such as RDBS, IBOC, etc. Further, the terminal can be configured to maintain communication network monitoring while receiving broadcast signals by switching the receiver back to a communication network signal long enough to check for pages, etc.

33 Claims, 3 Drawing Sheets

U.S. PATENT DOCUMENTS

| | | | |
|---|---|---|---|
| 7,130,599 B2 * | 10/2006 | Persico et al. | 455/147 |
| 7,221,688 B2 * | 5/2007 | Vanness | 370/529 |
| 7,313,414 B2 * | 12/2007 | van Rooyen | 455/553.1 |
| 7,634,794 B1 * | 12/2009 | Paik et al. | 455/313 |
| 7,756,551 B2 * | 7/2010 | Lewis | 455/569.1 |
| 2002/0111160 A1 * | 8/2002 | Fujise et al. | 455/422 |
| 2003/0072257 A1 | 4/2003 | Ikedo et al. | |
| 2003/0137609 A1 * | 7/2003 | Hayakawa | 725/59 |
| 2004/0072575 A1 * | 4/2004 | Young et al. | 455/456.1 |
| 2004/0198217 A1 * | 10/2004 | Lee et al. | 455/3.01 |
| 2004/0204168 A1 * | 10/2004 | Laurila | 455/569.1 |
| 2005/0287972 A1 * | 12/2005 | Christensen et al. | 455/186.1 |
| 2009/0154610 A1 * | 6/2009 | Parker | 375/343 |

FOREIGN PATENT DOCUMENTS

GB  2358990 A  *  8/2001

OTHER PUBLICATIONS

Methods and Systems for Determining the Position of a Mobile Terminal Using Digital Television Signals; 32 pgs.

First Office Action dated Feb. 6, 2009, issued in connection with Chinese Patent Application No. 200480042732.1, application date Oct. 21, 2004.

* cited by examiner

LOW COST METHOD FOR RECEIVING BROADCAST CHANNELS WITH A CELLULAR TERMINAL

RELATED APPLICATIONS

This application claims priority under 35 U.S.C. §119(e) from the following U.S. provisional application: Application Ser. No. 60/563,074 filed on Apr. 16, 2004. This application is expressly incorporated in its entirety by reference herein.

BACKGROUND OF THE INVENTION

The present invention generally relates to wireless communication devices, and particularly relates to receiving broadcast signals in such devices, such as broadcast radio and television signals.

Consumer expectations of ever-increasing performance and convenience coupled with simultaneous expectations of ever decreasing size and cost establish significant challenges for designers of portable devices. Nowhere are such pressures felt more keenly than in the arena of wireless communication device design.

Functional lines blur and product categories stretch with the continuous introduction of new portable wireless devices that merge multiple functions. Ready examples of such merged products come easily to mind. Personal Information Managers (PIMS) includes cellular radiotelephones or vice versa, handheld computers include wireless network and cellular radio interfaces, mobile terminals include cameras, and the list goes on.

Wireless communication devices that include AM/FM radios represent one seemingly natural merger of product types. Consumers might be expected to appreciate the ability to listen to the radio while not using their wireless devices for other purposes. Indeed, the more functions provided by a single device, the less other devices are needed and the more that single device becomes integrated into everyday lifestyle. Unfortunately, the integration of such secondary functions into a device that already faces tremendous constraints on cost, size, battery life, and time to market, may make already challenging design goals impossible to meet.

SUMMARY OF THE INVENTION

The present invention comprises a method and apparatus wherein a wireless communication terminal includes a broadcast signal frequency converter that is communicatively coupled to the terminal's communication signal receiver, and is configured to use its communication receiver to process received broadcast signals. An exemplary broadcast signal frequency converter includes a frequency shifting circuit to shift broadcast frequency bands into communication signal frequency bands compatible with the communication receiver's signal path. Thus shifted, the broadcast signals are sampled and processed using the digital domain signal processing capability of the communication receiver.

As such, the terminal's communication receiver can be used to receive broadcast radio and television signals, such as FM, AM, weather band, etc., provide signal reception enhancements, and extract other types of information from received broadcast signals such as RDBS, IBOC, sideband signaling, etc. Further, the terminal can be configured to maintain communication network monitoring while receiving broadcast signals by switching the receiver back to a communication network signal long enough to check for incoming calls, messages, etc.

An exemplary wireless communication terminal according to one or more embodiments of the present invention therefore comprises a cellular receiver and a broadcast signal frequency converter coupled to the cellular receiver. The terminal is configured to receive and process wireless communication signals in one or more communication signal frequency bands via the cellular receiver. Further, it is configured to receive broadcast signals, e.g., radio, tv, etc., in one or more broadcast frequency bands via the broadcast signal frequency converter, shift received broadcast signals into one of the communication signal frequency bands, and process the shifted broadcast frequency signals via the cellular receiver. Such a configuration puts the cellular receiver to the dual use of processing broadcast signals and communication signals, which greatly reduces the circuitry needed to add broadcast signal reception to the terminal's capabilities, as well as providing high quality broadcast signal processing and exemplary output of broadcast signal information. For example, the terminal can provide local audio output of received radio broadcasts, can display station/song information on its display, or can provide a received tv signal output on its display.

Similarly, an exemplary method according to one or more embodiments of the present invention comprises receiving broadcast signals in a wireless communication terminal based on frequency shifting a received broadcast signal into a frequency band compatible with a communication signal receive path of the terminal to obtain a shifted signal. The terminal then processes the shifted signal via the communication signal receive path. An exemplary terminal comprises a cellular radiotelephone that shifts received broadcast signals into a frequency band compatible with its communication signal receive path by block converting a broadcast frequency band into a cellular radio band. Simply put, received signals in a broadcast frequency band are shifted into a cellular radio band.

Of course, the present invention includes additional aspects, some of which are set forth in the following detailed discussion. Other features and advantages will be apparent to those skilled in the art upon reading the below discussion and upon viewing the accompanying illustrations.

BRIEF DESCRIPTION OF THE DRAWINGS

FIG. 4 is a diagram of an exemplary circuit that integrates a broadcast signal frequency converter into a communication receiver circuit.

DETAILED DESCRIPTION OF THE INVENTION

Figure 1:
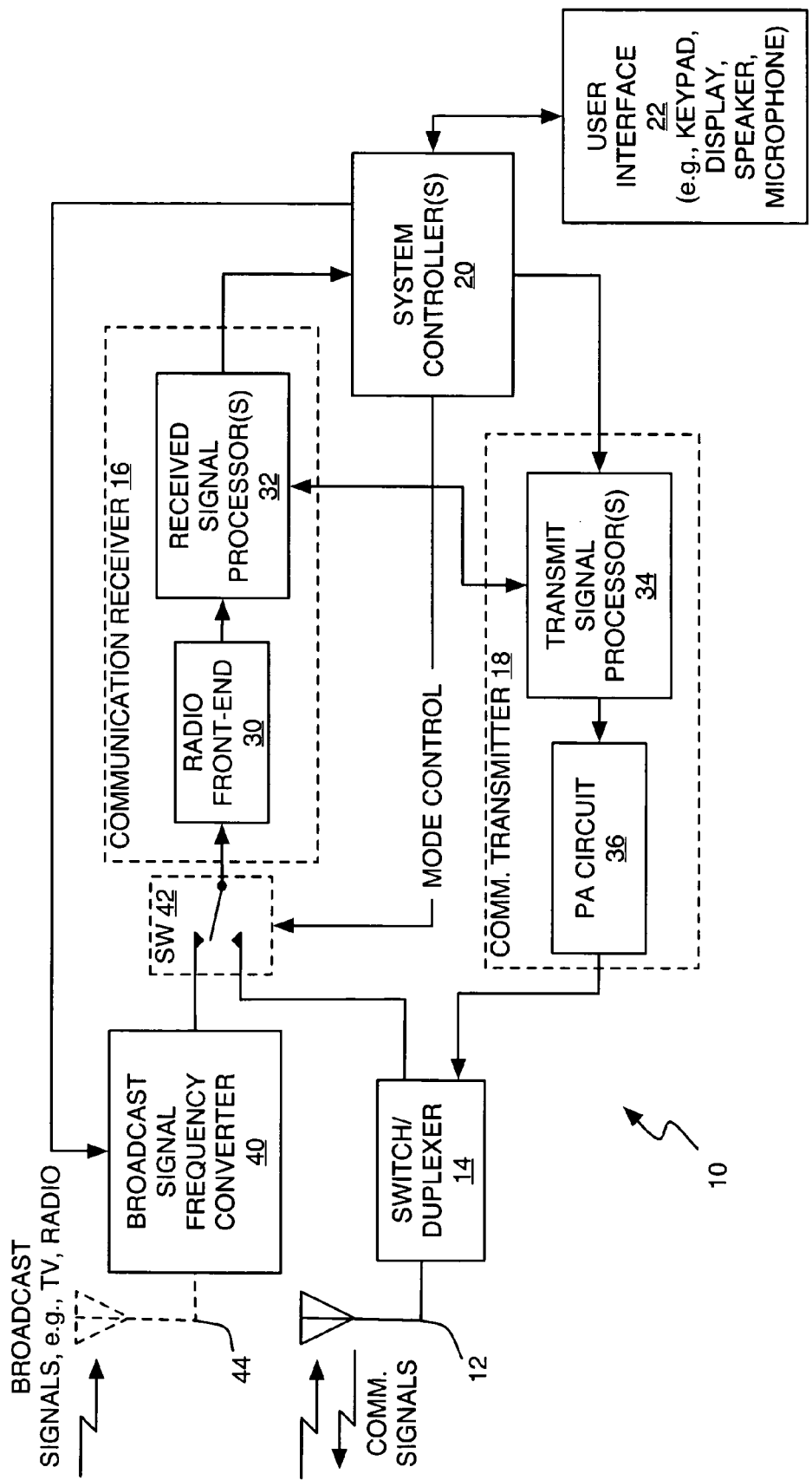
FIG. 1 is a diagram of an exemplary wireless communication device configured according to one or more embodiments of the present invention.

FIG. 1 is a diagram of an exemplary wireless communication device 10 that is configured according to an exemplary embodiment of the present invention. Device 10, which also is referred to as a "terminal" herein, may comprise a cellular radiotelephone, a wireless Personal Information Manager (PIM), a wireless handheld computer, or other type of wireless device.

With the above in mind, then, the exemplary device 10 comprises an antenna 12, a switch/duplexer 14, a communication receiver 16, a communication transmitter 18, one or more system controllers 20, e.g., one or more microcontrollers or other digital processing logic, and a user interface 22 that may include one or more of the following: a keypad for data, command, and dialing input, a display for providing information to a user, a microphone for receiving voice and other audio input to the user, and a speaker for outputting audio signals to the user.

Continuing on with the illustrated circuit elements, the exemplary communication receiver 16 comprises a radio front-end 30 and one or more received signal processors 32, which may be broadly understood as comprising hardware, software, or a desired mix thereof, that provide digital signal processing for digital signal samples output by the radio front-end 30. In an exemplary embodiment, processors 32 are configured to implement signal demodulation, decoding, equalization, etc. as needed in dependence on communication signal formats and desired performance characteristics. Possible communication signal formats include but are not limited to wireless communication standards such as IS-95B/IS-2000 Code Division Multiple Access (CDMA), Wideband CDMA, or GSM/PCS (in its various frequency bands).

The exemplary communication transmitter 18 similarly may be implemented in hardware, software, or some combination thereof, and comprises one or more transmit signal processors 34 and a transmitter amplifier circuit 36 (e.g., a power amplifier circuit). Those skilled in the art will appreciate that either or both the received signal processor(s) 32 and transmit signal processor(s) 34 may be integrated into or otherwise considered part of a baseband processor circuit, which may be an ASIC, a DSP, a microcontroller, or any combination thereof.

In any case, it should be understood that the above details can be varied and that an actual terminal 10 may include elements not explicitly illustrated, such as one or more memory devices or other data storage elements, and may omit some elements that are illustrated. Such variations are not material to understanding the exemplary usage and configuration of communication receiver 16 to process broadcast signals, such as broadcast radio and tv signals, in addition to its expected processing of wireless communication signals. To that end, the exemplary terminal 10 further comprises a broadcast signal frequency converter 40, an optional coupling element 42 (e.g., a RF switch), and an optional additional antenna 44.

In exemplary operation, the terminal 10 is configured to operate in either a first mode wherein it receives and processes incoming communication signals from a wireless communication network, or in a second mode wherein it receives and processes incoming broadcast signals. When reception and processing of incoming wireless communication signals is desired (or required), terminal 10 couples incoming communication signals received on antenna 12 to a received signal input of the communication receiver 16 via switch/duplexer 14 and switch 42. In that mode, the communication receiver 16 is configured to carry out digital signal processing within its receiver path that is appropriate for the type of communication signal being received.

Conversely, when reception of broadcast signals is desired, terminal 10 couples a signal output of broadcast signal frequency converter 40 through switch 42 to the receiver input of communication receiver 16. By this action, received broadcast signals are provided as analog input signals to the communication receiver 16 for digitization and appropriate signal processing in the digital domain. Of course, it will be recognized that the digital signal processing applied to broadcast signals generally will be different from that applied to incoming communication signals, which may be in complex digital modulation formats, and which may require sophisticated equalization or other interference cancellation, decoding, etc.

On that point, such changes in processing are handled easily by the exemplary receiver based on, for example, executing different signal processing programs at different times, reconfiguring programmable signal processing circuits, etc. Essentially, broadcast signal processing is carried out for no added cost within the eminently capable signal processing circuits of the communication signal processor. Indeed, with the computational "horsepower" of even the average terminal's digital signal processing circuits, broadcast signal processing can be made significantly more sophisticated than would be feasible in a conventional broadcast radio/tv receiver. For example, stereo reception, sophisticated filtering, equalization, etc., all may be implemented using the communication receiver's innate processing capabilities.

Of particular interest, the built-in signal processing capabilities of the communication receiver 16 may be used to extract other types of signal information from received broadcast signals in addition to, or as an alternative to, the expected audio or video signal information. That is, in addition to extracting audio or video signal information from tv, FM, AM, weather band, and other broadcasts, the signal processing capabilities of the communication receiver 16 can be used to extract non-audio information, such as Radio Data Broadcast System (RDBS) information, In Band On Channel (IBOC) information, or other signaling information (such as sideband signaling components).

The extracted non-audio information may be stored in the terminal, displayed to the user, or both, or used in some other aspect of the terminal's operation. Indeed, as terrestrial digital radio broadcasting comes into its own, the ability to receive and process digital content included in broadcast signals represents a significant alternative or supplemental mechanism for providing data to portable device users.

Regardless, in returning to exemplary details associated with operating the terminal 10, it should be noted that terminal 10 may be configured for communication signal processing as a default mode, and may be configured to switch to broadcast signal processing responsive to user input, for example. As such, terminal 10 may provide its user with a simulated radio and/or tv control interface via its display and/or keypad, and tune in selected broadcast signal bands and particular radio and tv stations responsive to user input. As will be explained later herein, even when terminal 10 is placed in a broadcast signal mode, it is not cut off from a supporting wireless communication network (not illustrated) as it may be configured to periodically switch its communication receiver 16 from processing the incoming broadcast signals to processing incoming network communication signals long enough to check for incoming calls, messages, other paging signals, etc.

Figure 2:
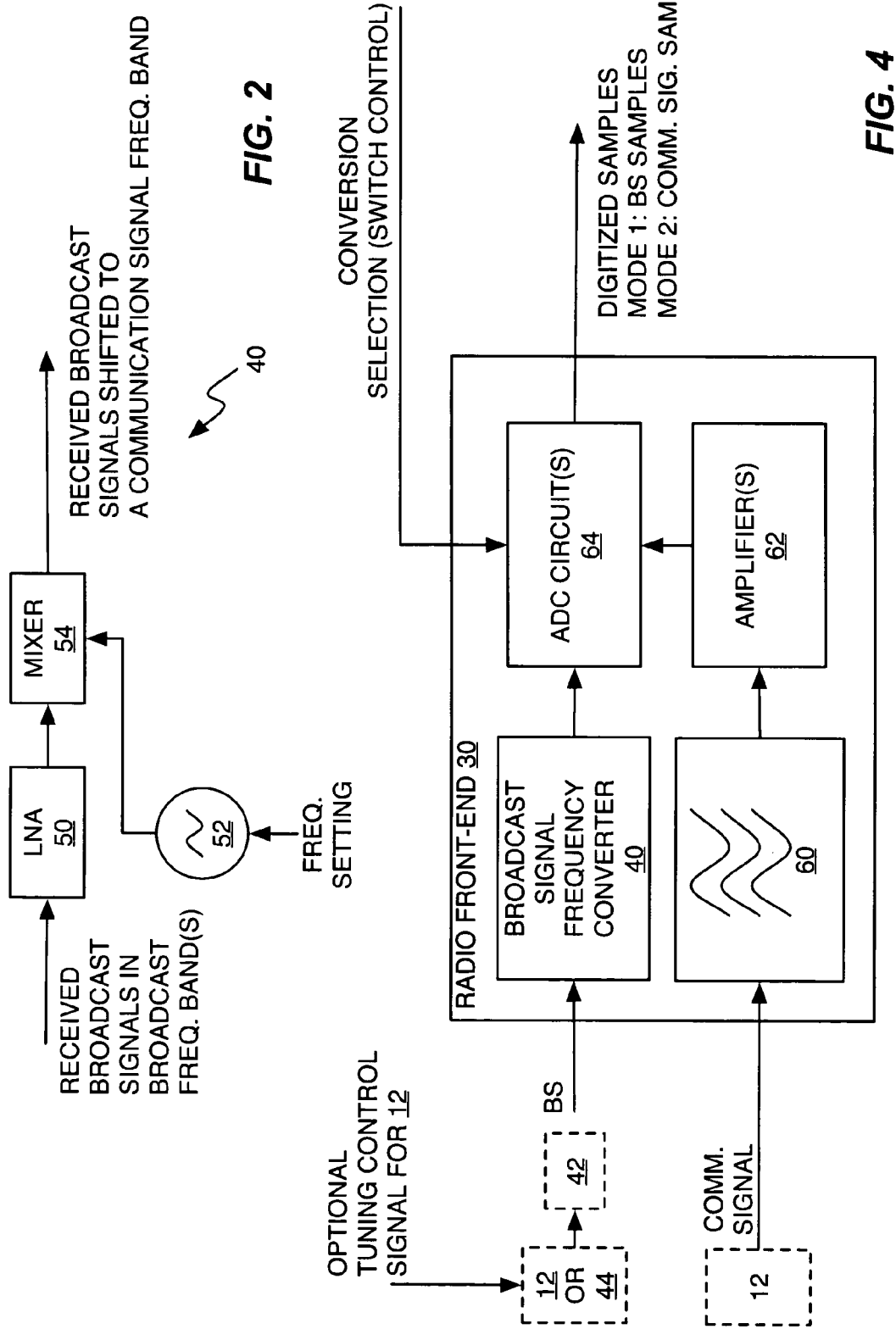
FIG. 2 is a diagram of an exemplary broadcast signal frequency converter.

FIG. 2 illustrates exemplary details for the broadcast signal frequency converter 40. In the illustrated embodiment, converter 40 comprises a low-noise amplifier (LNA) 50 and a frequency shifting circuit that includes or is associated with an oscillator 52 and a mixer 54. LNA 50, which may comprise a tunable circuit responsive to system controller 20, for example, provides a low-level signal corresponding to a desired broadcast signal frequency. That signal is then frequency shifted by mixer 54 into a communication signal band such that the shifted signal is frequency compatible with the received signal-processing path of the communication receiver 16. Indeed, by shifting received broadcast signals into a communication signal frequency band that is "native" to the communication receiver 16, the various sampling (digitization), filtering, and other fundamental signal processing operations carried out by the communication receiver 16 are compatible.

Such frequency compatibility yields at least the two-fold advantage of not requiring changing clock signals, filters, etc., in the receiver chain, which keeps cost and complexity low, and keeping the communication receiver 16 within its native frequency band(s) keeps it ready for rapid, temporary switchovers to communication signal monitoring. Such switchovers permit the terminal 10 to periodically check for pages, stay registered in a supporting wireless network, etc., during periods of broadcast signal reception without causing undue interruptions in the reception of that broadcast.

Figure 3:
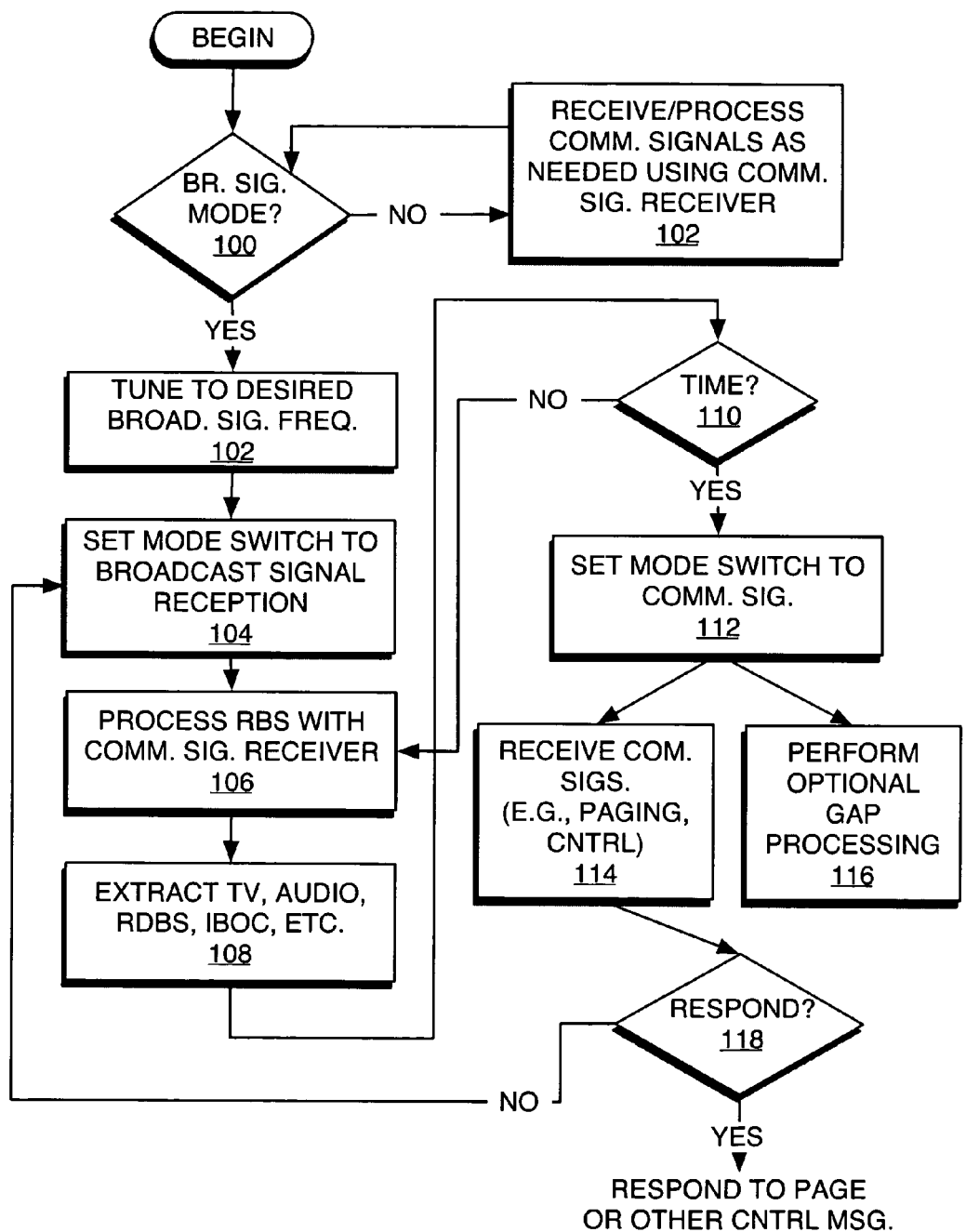
FIG. 3 is a diagram of exemplary processing logic associated with receiving and processing broadcast signals and wireless communication signals.

In looking at switch-over operation in the context of an exemplary processing logic flow that can be carried out by terminal 10, FIG. 3 illustrates that processing "begins" with a determination of whether broadcast signal mode operation is desired (Step 100). Such a desire might be indicated by user input, for example. If broadcast signal reception is not desired, terminal 10 carries on with receiving and processing (and transmitting) wireless communication signals as needed or desired (Step 102).

If broadcast signal reception is desired, terminal 10 "tunes" to the desired broadcast signal frequency, which might be selected by the user according to "favorite" station presets accessed through the user interface 22, for example. Terminal 10 couples the broadcast signal frequency converter 40 to communication receiver 16 by actuating switch 42 (or by some other connection means as needed or desired). Since switch 42 as shown in FIG. 1 sets the receiving mode to communication signal or broadcast signal reception, switch 42 may be referred to as a "mode" switch. However, other circuit arrangements can be used to put communication receiver circuit 16 to the dual use of receiving either broadcast signals or wireless communication signals.

With the frequency-shifted analog output signal from converter 40 now coupled to the communication receiver's input, that shifted signal is sampled (digitized) and the sampled waveform is processed in the digital domain by communication receiver 16 as needed or desired (Step 106). Any audio information extracted from the waveform samples can be output by terminal 10 using a built-in speaker, provided to the user on a headphone output, or retained in digital format for storage in memory in anticipation of later playback, etc. Similarly, the terminal's display may be used for viewing received tv broadcasts (Step 108).

Similarly, any non-audio information included in the received broadcast data signals, e.g, RDBS, IBOC, or other information, can be extracted in the digital domain and output to the user in the appropriate format and/or stored for later use (Step 108). By way of non-limiting examples, the terminal 10 may process RDBS information to provide the user with received broadcast station identifications, current song titles, upcoming play lists, etc., while IBOC information can be used for the same purpose or for receiving news services, stock quotes, etc.

While such processing is ongoing, the exemplary terminal 10 can be configured to stay in contact with its supporting wireless communication network. As such, it may run a timer or use some other timing mechanism to control a periodic monitoring switch-over to its supporting wireless communication network. If the timing interval has expired (Step 110), e.g., a half-second monitoring interval, the terminal temporarily switches communication receiver 16 from receiving and processing incoming broadcast signals to receiving and processing incoming wireless communication signals from the network (Step 112).

Thus switched over, the terminal 10 receives a paging channel signal (or other overhead/control channel signal) long enough to determine whether the terminal 10 is being paged, or otherwise has a pending call, message, or other network-related event pending (Step 114). If necessary, terminal 10 can break out of or otherwise suspend broadcast signal reception in favor of carrying out communication network operations, such as responding to paging, answering incoming calls, receiving Short Messaging Service (SMS) messages, Multimedia Messaging Services (MMS) messages, etc.

Further, during its switch-over time, the exemplary terminal 10 can be configured to perform optional gap processing (Step 116), wherein the terminal 10 uses its signal processing capability to generate signal information used to fill reception gaps in the incoming broadcast signal caused by the terminal's temporary switchover to the wireless network. While such gaps typically should be brief, e.g., less than 20 ms, they nevertheless may be noticeable in any signals being generated from the received broadcast signal.

For example, any one of known signal processing algorithms can be implemented by terminal 10 to "continue" audio or video play through the gaps based on generating local gap filling signal information (Step 116). Such algorithms may be quite simple, e.g., repeating a last sample through the gap, or more sophisticated, e.g., synthesizing samples by signal modeling. Gap filling also may be used for any non-audio information that is interrupted by monitoring switchovers. However, in the case of non-audio information, gap-filing processes may take advantage of any error encoding or other forward error correction information that may be used in transmitting the non-audio information.

Regardless, if the terminal 10 determines that its appropriate to return from its switchover (Step 118), it sets the mode switch 42 back to the broadcast signal mode (Step 104). From there, processing repeats as described above.

Turning from exemplary processing logic to exemplary functional implementations of terminal 10, FIG. 4 illustrates an embodiment wherein the broadcast signal frequency converter 40 is integrated into the radio front-end 30 of the communication receiver. It should be understood that such integration is not required but may offer one or more advantages. For example, communication receiver front-ends typically must meet exacting performance requirements and, as such, are well suited for implementing the LNA 50 included in broadcast signal frequency converter 40. Further, other elements, such as the oscillator 52 already may be available in the communication receiver 16. Additionally, the underlying fabrication process technologies, e.g., Silicon Germanium (SiGe) commonly used for radio front-end 30, are compatible with the needs of broadcast signal frequency converter 40.

FIG. 4 further illustrates just a few of the several antenna options contemplated by the present invention. Broadcast signal frequency converter 40 may have its own antenna 44 (as shown in FIG. 1), or may use the same antenna 12 as used for transmitting and receiving wireless communication signals. Terminal 10 optionally may be configured with a tunable antenna 12 such that its nominal frequency range is adjusted for broadcast signal mode and for communication network mode. However, it is expected that antenna 12 can be used for both modes without any such tuning.

Of course, whether or not antenna tuning is used is a matter of design preference depending on the needs arising in a particular terminal's design. It should be understood that in these and other matters the present invention's implementation details may be varied significantly without departing from its scope. Nor are the above exemplary details limiting with regard to the present invention. Indeed, the present invention is limited only by the following claims and their reasonable equivalents.

What is claimed is:

1. A wireless communication terminal comprising a cellular receiver and a broadcast signal frequency converter coupled to the cellular receiver, wherein the terminal is configured to receive and process wireless communication signals in one or more communication signal frequency bands via the cellular receiver, and is further configured to receive a broadcast signal in a broadcast frequency band, the broadcast signal comprising one of a broadcast FM radio signal, a broadcast AM radio signal, a broadcast television signal, and a broadcast shortwave radio signal, shift the received broadcast signal into one of the communication signal frequency bands via the broadcast signal frequency converter, and process the shifted broadcast signal via the cellular receiver.

2. The terminal of claim 1, wherein the terminal comprises one or more processing circuits operatively associated with the cellular receiver and configured to switch the cellular receiver between processing the communication signals and processing the shifted broadcast signal.

3. The terminal of claim 1, wherein the terminal is configured to generate at least one of an audio signal and a video signal responsive to digitizing and processing the shifted broadcast signal.

4. The terminal of claim 1, wherein the terminal is configured to perform signal enhancement for the received broadcast signal via digital signal processing in the cellular receiver.

5. The terminal of claim 1, wherein the terminal is configured to extract non-audio signal information from the received broadcast signal via digital signal processing performed in the cellular receiver.

6. The terminal of claim 5, wherein the terminal is configured to extract non-audio information as one or more of Radio Data Broadcast System (RDBS) information and In Band On Channel (IBOC) information.

7. The terminal of claim 1, wherein the terminal is configured to continue monitoring transmissions from a wireless communication network while receiving and processing the received broadcast signal based on periodically temporarily switching the cellular receiver from processing the incoming broadcast signal to processing incoming wireless communication signals.

8. The terminal of claim 7, wherein the terminal is configured to generate signal information locally to fill broadcast signal reception gaps caused by periodically temporarily switching the cellular receiver from processing the incoming broadcast signal to processing the incoming wireless communication signals.

9. A method of receiving broadcast signals in a wireless communication terminal comprising:
frequency shifting a received broadcast signal into a frequency band compatible with a communication signal receive path of the terminal to obtain a shifted signal, the received broadcast signal comprising one of a broadcast FM radio signal, a broadcast AM radio signal, a broadcast television signal, and a broadcast shortwave radio signal; and
processing the shifted signal via the communication signal receive path.

10. The method of claim 9, wherein the terminal comprises a cellular radio terminal, and wherein frequency shifting a received broadcast signal into a frequency band compatible with a communication signal receive path of the terminal comprises block converting a broadcast signal frequency band into a cellular radio band such that received signals in the broadcast signal frequency band are shifted into the cellular radio band.

11. The method of claim 9, wherein processing the shifted signal via the communication signal receive path comprises inputting the shifted signal into a radio front-end of the communication signal receive path to obtain corresponding digital samples of the shifted signal, and processing the digital samples to recover any analog and digital information conveyed by the received broadcast signal.

12. The method of claim 11, wherein the received broadcast signal conveys an analog audio signal, and wherein processing the digital samples to recover any analog and digital information conveyed by the received broadcast signal comprises processing the digital samples to recover the analog audio signal for audio output at the terminal.

13. The method of claim 11, wherein the received broadcast signal conveys digital data, and wherein processing the digital samples to recover any analog and digital information conveyed by the received broadcast signal comprises processing the digital samples to recover the digital data for further processing by the terminal.

14. The method of claim 13, wherein further processing of the recovered digital data by the terminal includes displaying information related to the recovered digital data on a display screen of the terminal.

15. The method of claim 13, wherein further processing of the recovered digital data by the terminal includes generating an analog audio output signal from the recovered digital data for output at the terminal.

16. The method of claim 11, wherein the received broadcast signal comprises a broadcast television signal, and wherein processing the digital samples to recover any analog and digital information conveyed by the received broadcast signal comprises processing the digital samples to recover an analog television signal for display at the terminal.

17. The method of claim 9, wherein the received broadcast signal comprises a FM radio signal, and wherein processing the shifted signal via the cellular receive path comprises sampling the shifted signal to obtain digital samples, and processing the digital samples to recover analog signal information conveyed in the received FM radio signal.

18. The method of claim 17, further comprising processing the digital samples to recover Radio Data Broadcast Signal information conveyed in the received FM radio signal.

19. The method of claim 9, wherein the received broadcast signal comprises an In Band On Channel (IBOC) signal, and wherein processing the shifted signal via the cellular receive path comprises digitizing the shifted signal to obtain digital samples, and processing the digital samples to recover IBOC data.

20. The method of claim 9, further comprising interrupting reception of the broadcast signal as needed to communicate with a cellular network.

21. The method of claim 20, wherein interrupting reception of the broadcast signal as needed to communicate with a cellular network comprises periodically interrupting reception of the broadcast signal to monitor transmissions from the cellular network.

22. The method of claim 9, further comprising generating signal information to fill signal gaps resulting from the interruptions in reception of the broadcast signal.

23. A wireless communication terminal comprising:
a broadcast signal frequency converter configured to receive a broadcast signal and shift the broadcast signal from a broadcast frequency band into a communication signal frequency band, the broadcast signal comprising one of a broadcast FM radio signal, a broadcast AM radio signal, a broadcast television signal, and a broadcast shortwave radio signal; and a communication signal receiver configured to process communication signals received from a wireless communication network in a first mode, and to process the frequency shifted broadcast signal in a second mode.

24. The terminal of claim 23, wherein the terminal further comprises a controller that is configured to control selection of the first and second modes.

25. The terminal of claim 24, wherein the controller is configured to control selection of the first and second modes responsive to user input.

26. The terminal of claim 24, wherein the controller is configured to temporarily switch from the second mode to the first mode to monitor transmissions from the wireless communication network while generally operating in the second mode.

27. The terminal of claim 26, wherein a signal processing circuit of the communication signal receiver is configured to generate data to fill reception gaps in broadcast signal being received by the terminal caused by temporarily switching from the second mode to the first mode.

28. The terminal of claim 23, wherein the broadcast signal frequency converter comprises a low-noise amplifier configured to generate an analog signal corresponding to the received broadcast signal, and further comprises a frequency conversion circuit configured to shift that analog signal into a communication signal frequency band.

29. The terminal of claim 23, wherein the frequency conversion circuit comprises a block converter that is configured to shift one or more broadcast signal frequency bands into one or more communication signal frequency bands.

30. The terminal of claim 23, wherein the communication signal receiver is configured to process the frequency shifted broadcast signal to extract analog signal information conveyed therein for audio or video output by the terminal.

31. The terminal of claim 23, wherein the communication signal receiver is configured to process the frequency shifted broadcast signal to extract one or more of the following types of information: Radio Data Broadcast System (RDBS) information, In Band On Channel (IBOC) information, and sideband signaling information.

32. The terminal of claim 23, wherein the communication signal receiver is configured to adjust its digital signal processing as a function of operating in the first mode or the second mode.

33. The terminal of claim 23, wherein the terminal is configured to display a television signal recovered from a received broadcast television signal via processing by its communication signal receiver.

* * * * *